United States Patent [19]

Purtell et al.

[11] Patent Number: 4,795,100
[45] Date of Patent: Jan. 3, 1989

[54] CONSERVATION IRRIGATION

[76] Inventors: Rufus J. Purtell; Forest M. Hoch, both of P.O. Box 1152, Brownfield, Tex. 79316

[21] Appl. No.: 97,460
[22] Filed: Sep. 16, 1987
[51] Int. Cl.⁴ .................. A01G 25/09; B05B 15/08
[52] U.S. Cl. ............................ 239/734; 239/588
[58] Field of Search ............ 239/734, 726, 723, 587, 239/588, 172, 176

[56] References Cited

U.S. PATENT DOCUMENTS

| | | | |
|---|---|---|---|
| 2,706,133 | 4/1955 | North, Jr. et al. | 239/588 |
| 2,873,999 | 2/1959 | Webb | 239/588 |
| 3,117,725 | 1/1964 | Palmer | 239/587 |
| 3,143,295 | 8/1964 | Booker | 239/176 |
| 4,676,438 | 6/1987 | Sesser | 239/726 |

Primary Examiner—Andres Kashnikow
Assistant Examiner—Karen B. Merritt
Attorney, Agent, or Firm—Wendell Coffee

[57] ABSTRACT

A low pressure vibrator sprinkler is suspended by a flexible hose below an elongated horizontal elevated pipe. The pipe is mounted for movement upon a plurality of vehicles. The flexible hose is telescoped within a U-tube at the bottom so that the sprinkler is in a vertically upright position. The height of the sprinkler is adjusted by forming a loop in the tube. A band holds the loop to any given circumference.

18 Claims, 2 Drawing Sheets

CONSERVATION IRRIGATION

BACKGROUND OF THE INVENTION (1) Field of the Invention

This invention relates to agricultural irrigation and more particularly to irrigation systems having elevated horizontal elongated pipes carrying water under pressure, moved by vehicles traverse to their length, with a plurality of sprinklers dispersing water therefrom. Those persons making, using, or selling agricultural irrigation systems of this type have ordinary skill in this art.

(2) Description of the Related Art

Farmers recognize that the best way to water most crops is by a slow steady rain with large drops which are absorbed by the soil without packing or collapsing the soil and without damaging erosion.

Agricultural systems using elevated horizontal elongated pipes carrying water under pressure supported by vehicles which move the pipes transversely of its length and dispersing water therefrom by a plurality of sprinklers are well known to the art.

Many patents show such types of systems as well as them being commercially available upon the market. Systems are generally divided into two categories, one being designated as center pivot system and the other being designated as a rectilinear system.

Before this invention, many systems used drop tubes from the elevated horizontal pipe so that the sprinkers would be lower. It is desirable to have the sprinkler located as close to the top of the growing crop as suitable for operation. I.e., in the case of alfalfa, cotton, or beans, the sprinkler might be no more than 1 to 2 feet above the ground. In the case of grain sorghums, the sprinkler might be located 4 to 5 feet above the ground (1 foot above the top of the gram sorghum). In the case of corn, it might be desirable to have the sprinklers 7 to 8 feet above the ground, again, about 1 foot above the top of the crop at the time it was being irrigated. Using the same system for different crops and using the same system at different times of the year when the crops are at different heights, it is desirable to change the system. Certain drops have been developed to support the sprinkler below the horizontal pipe. Some of these systems had telescoping metal tubes somewhat like a slide trombone that could be clamped at different positions.

When there was not so much need to conserse the water used by such systems nor the need to conserve the energy used to pump the water at high volumes and high pressures, normally the systems operated at high pressures and the sprinklers to sprinkle water from such systems were high pressure sprinklers. Also, in many instances the water was dispensed from the system in fine sprays or mists which were subject to evaporation and also the distribution of the water was badly effected by wind. I.e., a sprinkler producing a fine mist distributed water in a pattern which was easily distored by the wind. By "high pressure" it is meant that the pressure at all sprinklers is at least 50 psi.

However, at the present time there is a great need to conserve both the quantity of water used and the energy used to pump the water. To conserve energy, it has been found desirable to use low pressures. By "low pressure" it is meant that the pressure at all sprinklers is less than 35 psi.

In recent years, low pressure spray nozzles on steel drop pipes are being widely used instead of impact sprinklers on top of the pipe. (Escalating energy cost have brought on this trend) However, the low pressure sprays often have 4-5 times the application rates of impact sprinklers (10-15 foot diameter versus 50-60 foot diameter). There is a growing need for a low pressure sprinkler that saves energy without sacrificing the benefits of broader coverage; and therefore, much lower application rates. Lower application rates enable the user to slow down the system and apply larger applications without exceeding the intake rate of the soil. For example, a 2 inch application instead of a 1 inch application also enables the operator to make fewer passes of the equipment over the field.

Senninger Irrigation, Inc., of Orlando, Fl. makes and distributes off center rotary action sprinklers which is shown in U.S. Pat. No. DES. 253,364 which issued Nov. 6, 1979. The sprinklers are sold under the trademark "THE WOBBLER", and are called jitter sprinklers herein. This type sprinkler is characterized by distributing water over an area of 45' to 50' in diameter at flow rates from one gallon per minute to 10 gallons per minute with a pressure of 20 psi. or less at the sprinkler. The different flow rates are obtained by using nozzles from 3/32 inch to ⅜ inch. The sprinklers have a random vibration or a jitter action to obtain an exceptionally good pattern of distribution. The water is dispensed in large drops and, because of the large diameter spray pattern, is applied slow enough to be absorbed by the soil without packing or collapsing the soil and without damaging erosion.

Difficulty has been experienced in using jitter sprinklers upon elevated horizontal elongated pipe moveable irrigation systems. Jitter sprinklers tended to damage the system because of their vibration and shock. In many cases, the vibration and shock caused the collapse of the system which resulted in manufacturers not recommending the use of this sprinkler. We have eliminated this problem by using a flexible hose for a drop to completely dampen all vibrations to the sprinkler system. Conventionally all low pressure sprays have been located downward. We allow the use of upright sprinklers (jitter or impact) in an upright position but below the pipe.

Senninger Irrigation, Inc. recognized the problems of the destructive nature of the vibrations and always recommended that "THE WOBBLER" sprinklers be mounted securely in an upright position. The manufacturer recommended that it be securely mounted on steel risers no higher than 4 feet above the ground level. Also, Senninger advertised "THE WOBBLER" as being particularly suited for solid set irrigation. This indicated to applicants that "THE WOBBLER" was not suitable for irrigation systems using movable elevated pipe.

SUMMARY OF THE INVENTION (1) Progressive Contribution to the Art

This invention is hanging the sprinkler by a flexible hose below the horizontal pipe of an elevated horizontal pipe irrigation system. Typical of such an installation is to provide a short metal J-shaped member at the horizontal pipe so that the flexible hose is connected to the existing connections of the horizontal pipe. In some systems, the flexible hose can be connected to the bottom of the horizontal elevated pipe and the upper metal "J" fitting is not required. The flexible hose extends downward to a bight wherein the flexible hose makes a "U" curve so that a sprinkler connected to the bottom or distal end of the flexible hose is in a vertical upright position. To form the bight at the bottom of the hose a rigid metal tube is formed into a "U" shaped bend and the flexible hose is telescoped within the "U" shaped tube.

An embodiment of this invention results in many advantages. For example, it is extremely easy to install. Those skilled in the art will understand that the horizontal pipe often bows between vehicles so that the pipe is not a uniform distance above the ground; however, it is desirable, as explained above, that the sprinklers be a uniform height above the ground. It is easy upon installation of the flexible hose, to cut the flexible hose to a length so that the sprinkler is a uniform height above the ground. It is preferred that the flexible hose will be cut so that the bottom of the bight is about 1' above the ground and that the sprinkler will be at a height of about 21" above the ground.

The height of of the sprinkler is most easily adjusted by placing a loop or pigtail in the flexible hose and holding the pigtail in position by a clamp or band encircling the paralleled looped hosed. It is obvious that the circumference of the loop will determine the height of the sprinkler above the ground. It has been found that the size of the loop can be set, and will not vary, by a rather loosely held clamp or band. Then, if it is desired to change the height of any one or all of the sprinklers, the operator simply changes the circumference of the loop by sliding one end or the other of the hose through the encircling band or clamp.

A major advantage is that the jitter sprinkler can be used without damage or destruction to the system as a whole. The flexible tubing dampens or isolates or contains the vibrations of the jitter sprinkler so that there is an absence of damage to the system as occurs when the sprinkler is rigidly or securely attached or mounted.

(2) Objects of this Invention

An object of this invention is to irrigate agricultural land.

Other objects are to irrigate agricultural land with a minimum evaporational loss of the water with the lowest possible energy use, and by application of the water to the land to prevent soil collapse and to prevent erosive runoff of the water.

Further objects are to achieve the above with devices that are sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is rapid, versatile, ecologically compatible, energy conserving, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not scale drawings.

Figure 1:
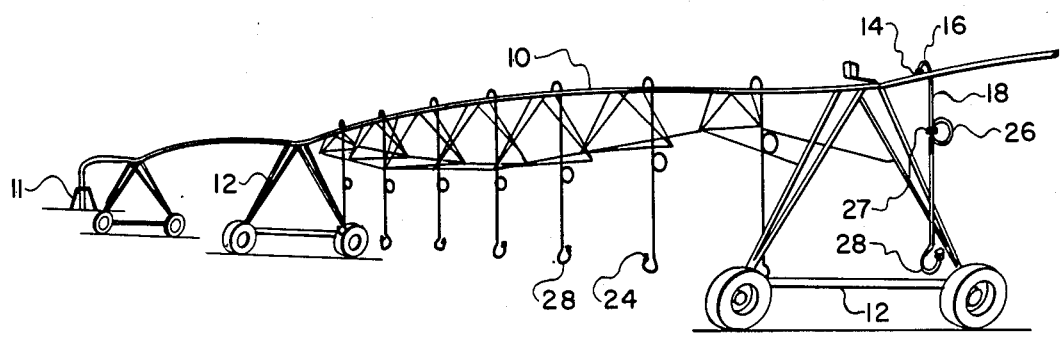
FIG. 1 is a perspective view of an irrigation system embodying the invention.
Figure 2:
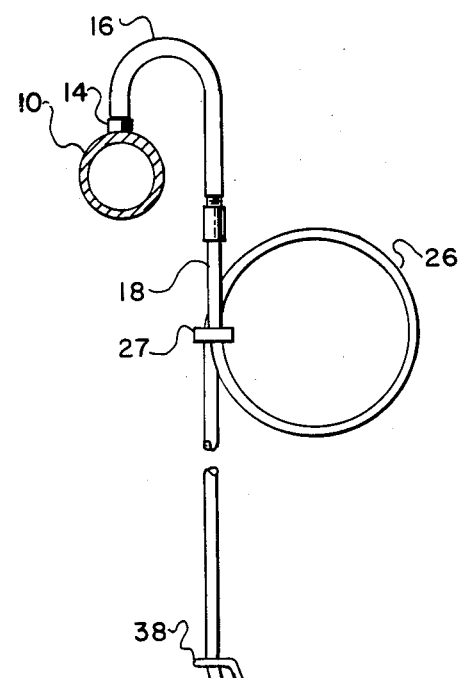
FIG. 2 is an elevational view of the flexible hose drop attached to the horizontal pipe with the sprinkler thereon.
Figure 2A:
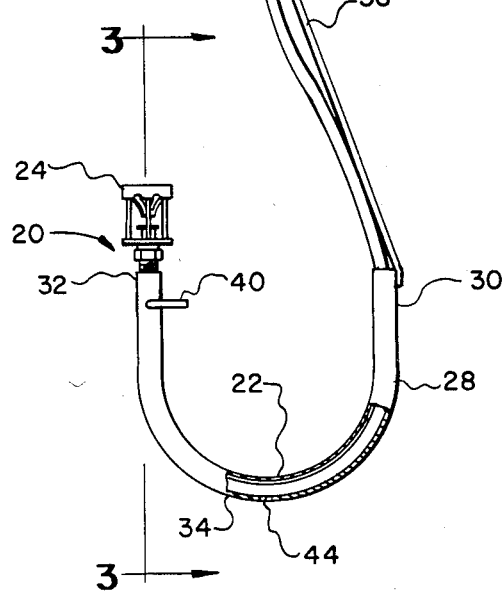
FIG. 2A is an enlarged detail of the hose and tube as shown in FIG. 2.
Figure 2A:
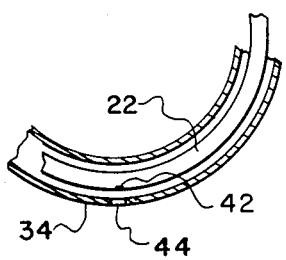
Figure 3:
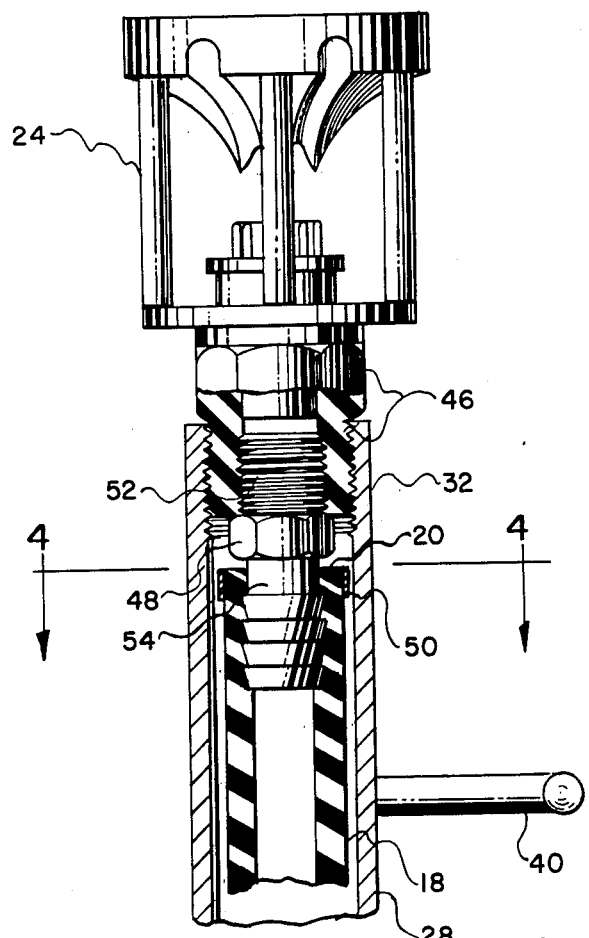
FIG. 3 is an axial sectional view of the flexible hose telescoped within the U-tube with the sprinkler connected thereto taken substantially on line 3—3 of FIGS. 2 and 4.
Figure 4:
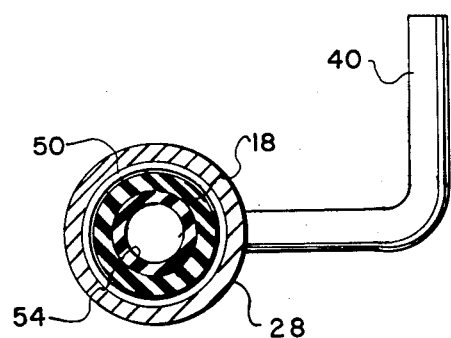
FIG. 4 is a cross sectional view taken substantially on line 4—4 of FIG. 3.

As an aid to correlating the terms of the claims to the exemplary drawing, the following catalog of elements and steps is provided:

10 horizontal pipe
32 sprinkler leg
11 source connection
34 tube bight
12 vehicles
36 leveler
14 sprinkler nipples
38 eyelet
16 J-member
40 hook
18 flexible hose
42 drip hole
20 distal end
44 drain hole
22 hose bight
46 base
24 sprinkler
48 barb connection
26 loop
50 spring band
27 loop band
52 threaded end
28 U-tube
54 barb end
30 leveler leg

DESCRIPTION OF THE PREFERRED EMBODIMENT

Referring to the drawing, there may be seen an irrigation system having elevated horizontal elongated pipe 10 which is adapted to carry water under pressure. As described above, it is preferred, for conservation of energy, that the water be low pressure water and usually in the range of 12 to 20 psi. Source connection 11 is a source of water under pressure connected to the pipe 10.

The horizontal pipe is supported by a plurality of vehicles 12. The vehicles form means for supporting the horizontal pipe 10 above the ground. The vehicles 12 also provide means for moving the horizontal pipe 10 traversely of its length.

The horizontal pipe 10 has sprinkler nipples 14 attached to the top. Short rigid J-member 16 is attached to each of the nipples. Flexible hose 18 is attached to the J-member and depends vertically downward. A flexible rubber hose having an outside diameter of about ⅜ inch works well.

The flexible hose 18 may be connected to the J-member 16 by any well known means such as by having a barb connection with a spring band around it or by having the hose connected into a female connector by adhesives.

The J-member 16 forms means for structurally and fluidly connecting the flexible hose 18 to the horizontal pipe 10. Those having skill in the art will understand that the flexible hose 18 might be directly connected into the bottom of the horizontal pipe 10 eliminating the J-member 16.

The lower end or distal end 20 of the flexible hose 18 is bent in a "U" shape. The bottom of the "U" or hose bight 22 is preferably about 12 inches above the ground. The distal end is about 18 inches above the ground and extends vertically upward. Sprinkler 24 is attached fluidly and structurally to the distal end 20.

When the irrigation system is used on crops which are appreciably above the ground, each of the sprinklers 24 is raised by forming a loop 26 in the flexible hose 18. The flexible hose can be formed having a loop 26 with about a 5 inch diameter which would thereby shorten the flexible hose 18 by about 16 inches. The sprinkler would be about 36 inches above the ground. However, the loop 26 may be made of any larger circumference so that that sprinkler 24 can be elevated to any desired height above the ground.

The loop 26 can be held by any convenient tight band 27. Although the band could be little more than twine, it is preferred that a plastic or metal band be used.

Preferably, the hose bight is formed by the use of a rigid U-tube 28.

Steel metal tubing having a outside diameter of 1⅛ inch and 0.083 wall thickness is suitable to make the U-tube 28. The inside diameter of the rigid U-tube will be about 1½ times the outside diameter of the flexible hose 18 which is telescoped therein. The U-tube 28 is "U" shaped having leveler leg 30, sprinkler leg 32, and tube bight 34 on the bottom.

Leveler 36 in the form of a rod extends from the leveler leg 30 upward along the flexible hose 18 to eyelet 38 which encircles the flexible hose. The eyelet bends the flexible hose so that the flexible hose at the point of the eyelet 38 is close to a vertical line above the tube bight 34. Since the flexible hose is telescoped within the U-tube 28, the hose bight 22 will be within the tube bight 34. The exact position of the eyelet 38 may be determined by use in the field so that when the flexible hose is full of water and the sprinkler 24 operating that the sprinkler is as near level as possible. The leveler rod may be adjusted as by bending the rod so that the sprinkler is in a vertical upright position.

A 5/16 inch steel rod is suitable for making the leveler 36, and the eyelet 38 should be about 10 inches above the top of the leg 30, which is to say that the leveler 36 would extend 15 times the outside diameter of the flexible hose 18.

Hook 40 is attached as by welding to the sprinkler leg 32 as shown in the drawings so that the U-tube 28 may be hung along side the horizontal pipe 10 when not in use. This achieves two purposes, one, it gets the flexible hose 18 up and out of the way; not hanging in an obstructive position. Also, the water will drain from the sprinkler 24. It is important that the water not set in the sprinkler 24 since some damage has been experienced if the sprinklers freeze with water in them.

Also so that the sprinklers 24 will drain, a small emitter or drip hole 42 is formed in the hose bight 22. A larger drain hole 44 is also formed in the tube bight 34 so that water can drain from the U-tube.

As described to this point, it will be understood that many types of sprinklers 24 could be used. However, it is preferred that a jitter sprinkler such as "THE WOBBLER" made by Senninger Irrigation, Inc., be used. Also, the sprinkler 24 might be structurally and fluidly connected to the flexible hose 18 by different means. By preferance, the inside diameter of the sprinkler leg 32 is tapped with standard ¾ inch pipe threads and base 46 of the sprinkler threaded into the sprinkler leg 32 of the U-tube 28. The base 46 of the sprinkler has internal threads threaded therein and a barb connection 48 threaded into the threads. The bar connection will have thread end 52 at one end, which is described above, threaded into the base 46. Barb end 54 on the other end is telescoped into the distal end 20 of the flexible hose 18. Spring band 50 is attached around the distal end 20 of the flexible hose 18 to hold the barb end 54 and the flexible hose securely together. Therefore, it may be see that the sprinkler 24 is fluidly and structurally connected to the flexible hose. The structural connection to the flexible hose is considered to include the structural connection to the sprinkler leg 32 of the U-tube 28.

It will be understood that in many instances the flexible hose 18 may be 10 feet long to reach from the top of the elevated horizontal pipe 10 to its lowest level.

Analyzing the system, it may be seen that the system is particularly suitable for use with any sprinklers which vibrate excessively. Sprinklers which vibrate excessively create shock. Also, it may be seen that the flexible hose functions as a tension member in suspending the sprinkler in an upright position below the horizontal pipe. Also, it may be seen that the flexible hose is a conduit to supply water under pressure from the elongated pipe to the sprinkler. Of the total conduit from the horizontal elevated pipe to the sprinkler, at least a portion of that total conduit is flexible so that it protects all of the equipment from the vibration and the shock resulting from the vibration which result from the sprinklers which vibrate excessively.

The embodiment shown and described above is only exemplary. We do not claim to have invented all the parts, elements or steps described. Various modifications can be made in the construction, material, arrangement, and operation, and still be within the scope of our invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. In an irrigation system having:
   a. an elevated horizontal elongated pipe adapted to carry water under pressure,
   b. a plurality of vehicles forming means attached to said horizontal pipe for supporting said pipe above growing crops and for moving said horizontal pipe transversely of its length, and
   c. a plurality of sprinklers;
   d. the improved method for connecting each of the sprinklers to said horizontal pipe comprising:
   e. structurally and fluidly suspending the sprinkler below the horizontal pipe by a flexible hose, by tension in the hose, and
   f. bending the flexible hose so that the sprinkler is vertically upright.

2. The invention as defined in claim 1, further comprising:
   g. fixing a loop in the flexible hose thereby adjusting the height of the sprinkler.

3. The invention as defined in claim 2, wherein:
   h. said sprinklers are low pressure jitter sprinklers, the vibration of which are i. dampened by the flexible hose.

4. In an irrigation system having:
   a. an elevated horizontal elongated pipe adapted to carry water under pressure,
   b. a plurality of vehicles forming means attached to said horizontal pipe for supporting said pipe above growing crops and for moving said horizontal pipe transversely of its length, and
   c. a plurality of sprinklers;
   d. the improved structures for connecting each of the sprinklers to said horizontal pipe comprising:
   e. a flexible hose having an outside diameter structurally and fluidly connected to said horizontal pipe and depending therefrom,
   f. said sprinkler fluidly and structurally connected to the hose, and
   g. means on the flexible hose for holding said sprinkler vertically upright.

5. The invention as defined in claim 4, further comprising:
   h. a loop in the flexible hose between the horizontal pipe and the sprinkler.

6. The invention as defined in claim 5, further comprising:
   i. a band around the flexible hose at the loop to maintain the circumference of the loop at an adjusted amount.

7. In an irrigation system having:
   a. an elevated horizontal elongated pipe adapted to carry water under pressure,
   b. vehicle means attached to said horizontal pipe for supporting said pipe above growing crops and for moving said horizontal pipe transversely of its length, and
   c. a plurality of sprinklers;
   d. the improved structures for connecting each of the sprinklers to said horizontal pipe comprising:
   e. a flexible hose having an outside diameter structurally and fluidly connected to said horizontal pipe and depending therefrom,
   f. said sprinkler fluidly and structurally connected to the hose,
   g. means on the flexible hose for holding said sprinkler vertically upright,
   h. said means for holding said sprinkler vertically upward includes a rigid U-tube having a circular cross section,
   i. said U-tube formed in the shape of a "U" having a bight and two legs, and
   j. said flexible hose telescoped within said U-tube.

8. The invention as defined in claim 7 further comprising:
   k. said U-tube being metal and having an inside diameter which is about 1½ times the outside diameter of the flexible hose.

9. The invention as defined in claim 7 further comprising:
   k. the distance between said vertical legs of said U-tube being about 10 times the outside diameter of the flexible hose.

10. The invention as defined in claim 7 further comprising:
    k. a leveler attached to one of the legs of said U-tube,
    l. said leveler being in the form of a bendable rigid rod extending along the flexible hose with
    m. an eyelet encircling the flexible hose at the top of the leveler, so that the sprinkler may be adjusted by bending the rod of the leveler,
    n. said leveler extending along the flexible hose for a distance equal to at least about 15 times the outside diameter of the flexible hose.

11. The invention as defined in claim 7 further comprising:
    k. a hook on the leg of the U-tube adjacent to the sprinkler,
    l. said hook adapted to hold the U-tube along the side of the horizontal pipe when not in use.

12. The invention as defined in claim 7 further comprising:
    k. a drip hole in the flexible hose at the bight of the U-tube,
    l. a hole in the bottom of the bight of the U-tube so that water will drip from the hose to drain the water level below the sprinkler when water is not supplied to the horizontal pipe.

13. The invention as defined in claim 7 further comprising:
    k. said sprinkler having a base,
    l. a portion of said base located at the top of one of the legs of the said U-tube called the sprinkler leg.

14. The invention as defined in claim 13 further comprising:
    m. internal pipe threads in the sprinkler leg, and
    n. external pipe threads on the sprinkler base threaded into the sprinkler leg thread so that the sprinkler is securely connected to the U-tube.

15. The invention as defined in claim 14 further comprising:
    o. a barb connection having external pipe threads on one end and a barb connection on the other end,
    p. internal pipe threads in the sprinkler base,
    q. said barb connection threaded to the sprinkler base, and
    r. said barb connection inserted into the flexible hose within the sprinkler leg of the U-tube.

16. The invention as defined in claim 15 further comprising:
    s. a loop in the flexible hose between the horizontal pipe and the sprinkler,
    t. a band around the flexible hose at the loop to maintain the circumference of the loop at an adjusted amount, and
    u. said sprinkler being a jitter sprinkler.

17. In an irrigation system having:
    a. an elevated horizontal elongated pipe adapted to carry water under pressure,
    b. vehicle means attached to said horizontal pipe for supporting said pipe above growing crops and for moving said horizontal pipe transversely of its length, and
    c. a plurality of jitter sprinklers;
    d. the improved structures for connecting each of the sprinklers to said horizontal pipe comprising:
    e. a flexible hose having an outside diameter structurally and fluidly connected to said horizontal pipe and depending therefrom,
    f. a rigid U-tube having a circular cross section,
    g. said U-tube formed in the shape of a "U" having a bight and two legs,
    h. said flexible hose telescoped within said U-tube,
    i. said sprinkler having a base,
    j. a portion of said base located at the top of one of the legs of the said U-tube called the sprinkler leg,
    k. internal pipe threads in the sprinkler leg,
    l. external pipe threads on the sprinkler base threaded into the sprinkler leg thread so that the sprinkler is securely connected to the U-tube, thereby holding said sprinkler vertically upright, m. a barb connection having external pipe threads on one end and a barb connection on the other end,
n. internal pipe threads in the sprinkler base,
o. said barb connection threaded to the sprinkler base,
p. said barb connection inserted into the flexible hose within the sprinkler leg of the U-tube so that said sprinkler is fluidly and structurally connected to the flexible hose,
q. a loop in the flexible hose between the horizontal pipe and the sprinkler,
r. a band around the flexible hose at the loop to maintain the circumference of the loop at an adjusted amount,
s. said U-tube being metal and having an inside diameter which is about 1½ times the outside diameter of the flexible hose,
t. the distance between said vertical legs of said U-tube being about 10 times the outside diameter of the flexible hose,
u. a leveler attached to one of the legs of said U-tube,
v. said leveler being in the form of a rigid rod extending along the flexible hose with
w. an eyelet encircling the flexible hose at the top of the leveler,
x. said leveler extending along the flexible hose for a distance equal to at least about 15 times the outside diameter of the hose,
y. a hook on the leg of the U-tube adjacent to the sprinkler,
z. said hook adapted to hold the U-tube along the side of the horizontal pipe when not in use,
aa. a drip hole in the flexible hose at the bight of the U-tube, and
bb. a hole in the bottom of the bight of the U-tube so that water will drip from the hose to drain the water level below the sprinkler when water is not supplied to the horizontal pipe.

18. In an irrigation system including the following equipment:
a. an elevated horizontal elongated pipe adapted to carry water under pressure,
b. a plurality of vehicles forming means attached to said horizontal pipe for supporting said pipe above growing crops and for moving said horizontal pipe transversely of its length, and
c. a plurality of sprinklers which vibrate excessively causing shock;
d. the improved method for structurally and fluidly connecting each of the sprinklers to said horizontal pipe comprising:
e. suspending the sprinkler in an upright position below the horizontal pipe by a flexible tension member,
f. supplying water under pressure from the elongated pipe to the sprinkler by a conduit, at least a major portion of which is flexible, thus
g. protecting all of the equipment from vibration and shock.

* * * * *